June 7, 1966 C. VOORHIES 3,254,899
POWERED SPRING SUSPENSION
Filed Dec. 12, 1963 3 Sheets-Sheet 2
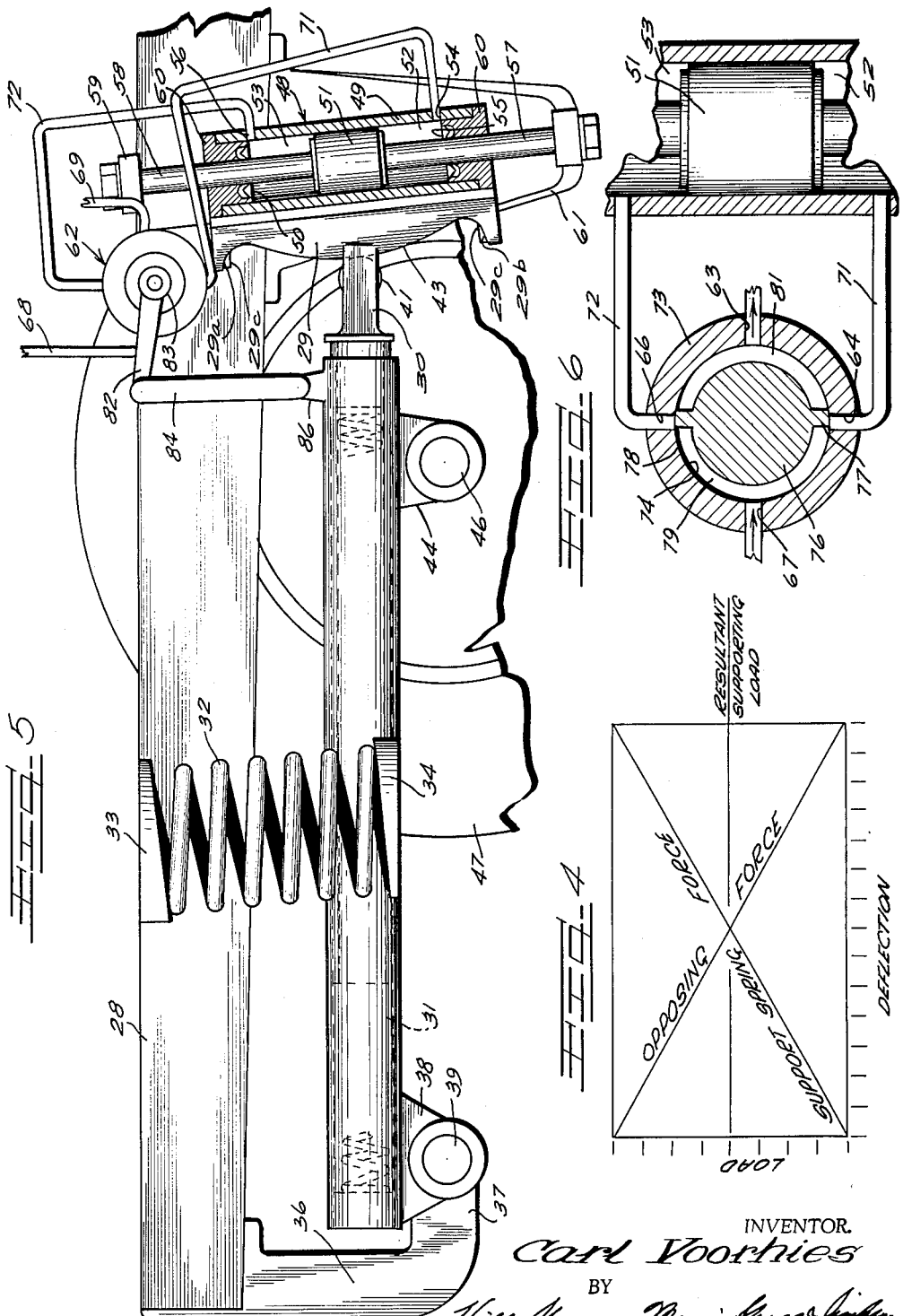
INVENTOR.
Carl Voorhies
BY
ATTORNEYS

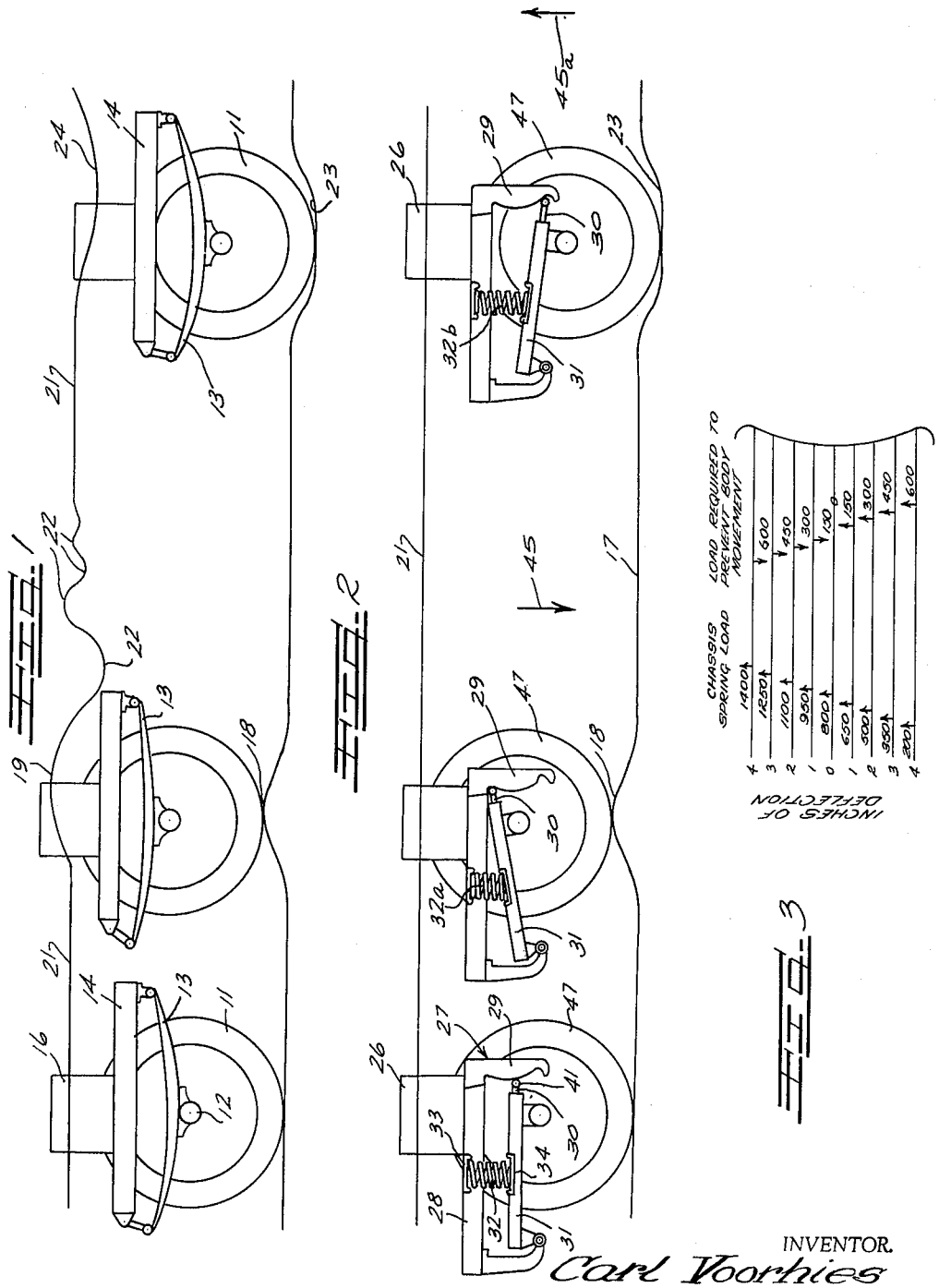

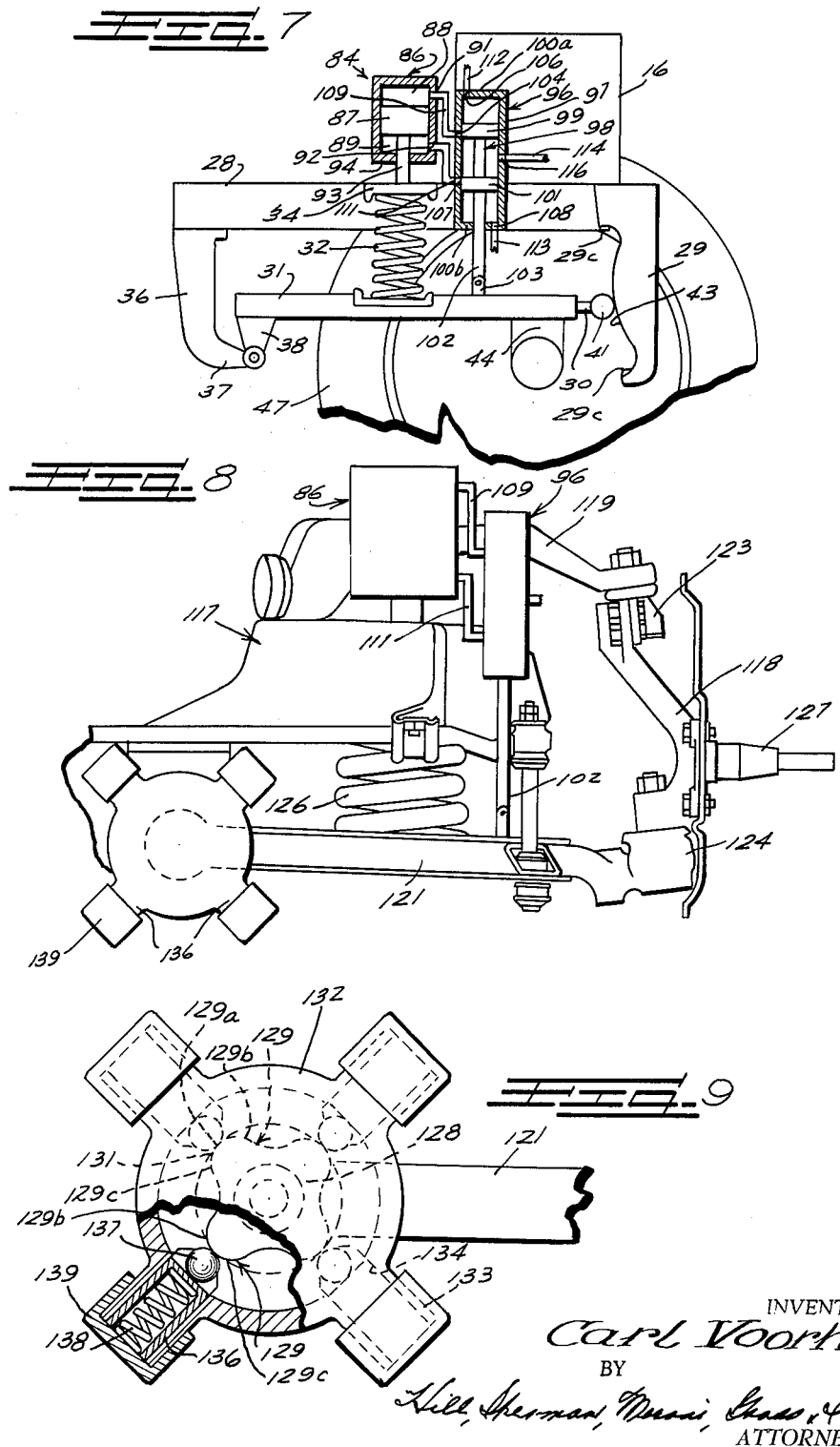

United States Patent Office 3,254,899
Patented June 7, 1966

3,254,899
POWERED SPRING SUSPENSION
Carl Voorhies, 2505 Villa Lane, McHenry, Ill.
Filed Dec. 12, 1963, Ser. No. 330,138
7 Claims. (Cl. 280—6)

This invention generally relates to a suspension system and more particularly relates to a compensated suspension system.

In conventional spring suspension systems common in the automotive practice today, the variation and load requirements are taken care of by the rate of the spring. For example, any amount of change in the load deflects the spring to a point producing the proper load with the rate of the spring determining the amount of spring compression necessary for supporting the load. When the spring is compressed, as when the wheel strikes a bump, the spring exerts a force on the body momentarily greater than the force necessary to support the body. As a result of this, the body must move upwards. In the case of the wheel dropping in a hole, the spring is opened to a point where momentarily it lacks the force to support the body and therefore the body drops. Added to this arrangement are shock absorbers which offer resistance in both directions to damp-out the motion of the body as a result of the sudden change in load but, at the same time, increasing the rate of acceleration of the body during the first impact or during the impact after the wheel has dropped into the hole. Therefore, since the force applied to the body is alternately less than or more than the amount necessary to support the body, an almost continuous motion is set up when the vehicle is traveling over a road having irregularities thereon. For these reasons, car manufacturers have continually tried to reduce the rate of the spring so that the amount of excessive pressure, or lack of pressure to support the body could be lessened. The lowest possible rate would produce the best possible ride, when vertical motion of the body alone is considered. However, there are problems of stability and natural vibrations which obviate the use of extremely low rate springs as well as the problems this produces in the position of the car body with respect to the wheel when the passenger load is changed. In other words, the lower the rate of the spring the greater distance the body will drop with respect to the wheel for a given added passenger load.

The present suspension system eliminates the problems of the prior art by providing a device which will cancel the rate of the spring due to vertical motion of the wheels and also compensate for load changes on the body. A motor vehicle is provided with a conventional chassis or load spring and has interposed between the car body and the wheel a cam and roller, one of which is attached to the body and the other attached to the axle or wheel spindle. A control spring applies a force to the roller or skid which contacts the cam in nearly a horizontal plane to create a vertical force component. The cam is constructed and the horizontal pressure supplied to the roller or skid is provided, such that throughout the range of available travel thereof the rate of the spring will be cancelled or counteracted by the vertical force component with the load remaining the same as the load that exists when the contact of the roller is centered on the cam at a point where the vertical component would be zero or where the angle of contact would be 90° to the line of force. This device permits the use of a much higher rate chassis load spring since the rate is to be cancelled in its effect on the body. The use of a higher rate chassis spring results in a lesser change in the position of the body as related to the wheel for a given change in passenger load. Therefore, with regard to the bumps and holes the wheel would encounter in an ordinary road the vehicle body would be maintained at a constant height because the pressure or force supporting the body would not change and it is necessary to have an outside force in order to move the body.

However, motor vehicles do not only encounter continuous straight motion, the body load changes when turns are encountered, brakes are applied, or passenger load varied. Therefore, to counteract these body load changes there is provided an automatic servomotor system which is connected to the cam to effect the adjustment of the position of the body. Since the natural frequencies of the wheel of a vehicle is in the order of ten times that of the body, the velocity of the servomotor is modified so that the relatively fast motion of the wheel would cause very little, if any, motion of the cam whereas the comparatively slow motion of the body would effect a considerable movement of the cam.

Although the present invention is hereinafter described in connection with the use in a motor vehicle it is understood that the present suspension system is applicable for various types of applications where it is desirable to support a mass without creating accelerating forces when the opposite end of the supporting spring is moved up and down such as supporting racks, suspending machinery from the hull of a ship, the suspension system for the seat in a vehicle, aircraft landing gears, trailer dolly wheels and etc.

Therefore, it is an object of the present invention to provide a spring suspension system which has no rate or extremely low rate within its operating range but has a load carrying capacity throughout its range of operation.

It is another object of the present invention to provide a spring suspension system having a deflection load rate sufficient only to overcome friction in the moving parts throughout a predetermined range of travel and having a means for automatically adjusting the load carrying capacity to support a variable weight.

It is another object of the present invention to provide a spring suspension system in which the rate of the supporting springs is counteracted and the load carrying capacity is automatically adjusted to support a variable load throughout a predetermined range of travel.

It is another object of the present invention to provide a spring suspension system wherein the rate of chassis spring is counteracted or cancelled by a vertical force produced by a control spring urging a cam follower roll or skid against a cam to provide a vertical force equal to the change in load of said chassis spring to cancel or counteract said chassis spring rate and also provide an automatic servomotor mechanism which will counteract varied loads encountered by the suspension system.

It is another object of the present invention to provide a suspension system for a vehicle body that will maintain the body at a predetermined level and at a constant horizontal plane even when the wheels of said body encounter depressions and bumps in the surface the body is traveling over and will compensate for load changes encountered by the body due to acceleration, deceleration, and turns of said vehicle.

Other features, objects and advantages of the present invention will become apparent to those skilled in the art after a careful consideration of the following detailed description taken in conjunction with the accompanying drawings wherein like reference numerals refer to like and corresponding parts.

On the drawings:

FIGURE 1 is a schematic illustration of the effects of a suspension system constructed in accordance with the principles of the prior art;

FIGURE 2 is a schematic illustration of a suspension system operated in accordance with the principles of the present invention;

FIGURE 3 is a chart illustrating the forces necessary to counteract and prevent body movement for a given chassis spring load;

FIGURE 4 is a graph illustrating the cancelling effect of the forces illustrated by the graph of FIGURE 3;

FIGURE 5 is a partial side elevational view with parts in cross-section illustrating a suspension system constructed in accordance with the principles of the present invention;

FIGURE 6 is a partial cross-sectional view with parts in elevation illustrating a servomotor control valve constructed in accordance with the principles of the present invention;

FIGURE 7 is a partial side elevational view with parts in cross-section illustrating another embodiment of a spring suspension system constructed in accordance with the principles of the present invention;

FIGURE 8 is a partial side elevational view of another spring suspension system constructed in accordance with the principles of the present invention; and FIGURE 9 is an enlarged elevational view of a rotating cam and follower mechanism utilized in the spring suspension system illustrated in FIGURE 8 and being constructed in accordance with the principles of the present invention.

As shown on the drawings:

Referring to FIGURE 1 there is schematically illustrated the typical riding characteristics of a motor vehicle utilizing a conventional spring suspension system. The conventional spring suspension system of a motor vehicle has each wheel 11 connected to a wheel spindle 12. Each wheel spindle 12 is connected to a chassis load leaf spring 13 which is interposed between the wheel 11 and the motor vehicle frame 14. The frame 14 carries a body load 16. As the vehicle travels along a typical road surface 17 the wheel 11 encounters a bump 18. Upon encountering the bump 18 the wheel rises to compress the spring 13 and thereby also raise the frame 14 and corresponding load 16 to a level 19 above its original level 21. Before the body and frame are returned to their original level 21 they go through a series of vibrations 22 which are above and below the original level 21. The time necessary for the vehicle to return to its original level is determined by the natural rate of the leaf spring 13, the frame 14, and body 16 as well as any auxiliary dampening means such as a shock absorber. Likewise, when the wheel 11 encounters a hole 23 in the road surface 17 the frame and body fall to a level 24 which is below the desired traveling level 21. Also, before the body and frame will return to the desired level 21, they go through a series of vibrations (not shown).

FIGURE 2 schematically illustrates what occurs when the body 26 is equipped with the suspension system 27 constructed in accordance to the principles of the present invention. The suspension system 27 comprises a frame 28, a cam 29, a tubular suspension arm 31 with a cam follower 30 connected therein, a coil chassis load spring 32 as well as means (not shown in this schematic illustration) to compensate for changes in the body load 26—said means being described hereinafter in greater detail.

Referring to FIGURES 2 and 5, the frame 28 has means 33 suitably attached thereto for fixedly securing one end of the chassis spring 32 thereto and the suspension arm 31 has suitable means 34 attached thereto for securing the other end of the chassis spring 32. Extending downwardly from the frame 28 is pivot arm 36 having an inwardly extending bottom leg 37. Extending downwardly from one end of the suspension arm 31 and suitably affixed thereto is a pivot arm or leg 38. The suspension arm pivot leg 38 is pivotally mounted to the frame pivot leg 37 by a pivot pin 39. Slidably mounted in the suspension arm 31 and extending from the other end of the suspension arm is a follower 30 having on the end thereof a roller or skid 41 which is urged by a control spring 42, suitably mounted within the suspension arm 31, against the cam surface 43.

Extending downwardly adjacent the other end of the suspension arm is a bracket 44 having a wheel spindle 46 suitably attached thereto and extending therefrom. Rotatably connected to the wheel spindle 46 is a support wheel 47. As the body 26 is carried along the road surface 17 it is desired to maintain it on a predetermined horizontal level 21. When the wheel 47 encounters the bump 18 the suspension arm 31 is pivoted upwardly to depress the chassis spring as is indicated by 32a. As the cam follower is pivoted upwardly the follower skid rises on the cam surface 43. However, due to downward vertical force component indicated at 45 the spring rate is cancelled by the canceling feature of the present invention, hereinafter described in greater detail, and the body 26 is not raised above its desired horizontal level nor does it go through a phase of vibrational instability. As the vehicle travels further, its wheel 47 meets a depression 23. The wheel 47 drops into the depression 23 and the cam follower 31 is pivoted downwardly to stretch the chassis spring as is indicated by 32b. However, due to the upward vertical force component indicated at 45a the spring rate is cancelled by the canceling feature of the present invention, and the load 26 is maintained at its predetermined horizontal level.

The rate canceling feature of the present invention, as has been schematically illustrated in FIGURE 2, is brought about by the configuration of the cam surface 43 and the force exerted thereagainst by the control spring 42 through the follower roll 41. For instance, assuming the chassis spring 32 has a rate of 150 lbs. and a 3-inch bump 18 is encountered. Then the upward pressure on the body would be 450 lbs. more than that necessary to support the body. Therefore, to counteract this 450 lbs. it is necessary to exert a 450 lb. downward vertical force. The vertical force is determined by the force of the control spring 42 and the configuration of the cam surface 43. The resultant load therefore necessary to support the body would remain unchanged. This relationship between the deflection of the support spring is brought out by the chart illustrated in FIGURE 3 and the graph illustrated in FIGURE 4. In the example illustrated by the chart, the body load is 800 lbs. and the spring rate is 150 lbs. per inch of deflection.

Therefore, it is seen where the suspension system of the present invention provides a means for suspending a body at a predetermined horizontal level and maintaining said predetermined horizontal level regardless of bumps and depressions in a road surface. However, the vehicle is also subjected to other forces which are not encountered by continuous straight motion. For instance, load requirements are changed by the vehicle when turns are encountered, brakes are applied, or passenger load varied. Therefore, in order to maintain the stability of the vehicle when encountering these conditions the present invention provides an automatic servomotor compensator 48 to allow the rate of the spring to counteract these load changes. The compensator 48 moves the cam 29 in a direction to follow the motion of the follower 30, with the motion of the cam being fast enough to provide for a change in body load for a relatively long duration but so retarded that it cannot follow relatively rapid motion such as when the wheel strikes a bump or drops in a hole.

Referring to FIGURES 5 and 6, the servo means 48 comprises a cylindrical piston housing 49 having a piston 51 mounted therein and dividing the housing into two pressure chambers 52 and 53. The housing 49 has the cam 29 suitably affixed to the side thereof and may be slidably connected to the frame if desired. A port 54 formed in the housing communicates with the pressure chamber 52 and a port 56 communicates with the pressure chamber 53.

Suitable rod or shaft means 57 and 58 are integral with or suitably attached to the ends of the piston 51 and project through end plugs 60 of the housing 49. The rods 57 and 58 have suitable means 59 and 61 respectively attaching said rods to the frame 28. The two end plugs 60 form a sealing fit with the rods and allow the housing to slide axially along said rods without losing fluid from within the chambers 52 and 53. Therefore, when pressure in the chamber 52 is greater than pressure in the chamber 53, the housing will move downwards with its end face 55 moving away from the piston 51 to move the cam 29 downwards. Likewise, when the pressure in the chamber 53 is greater than the pressure in the chamber 52, the housing and cam will move upwards and its end face 55 will move towards the piston 51.

The relative pressures in the chambers 52 and 53 are regulated by a servomotor control rotary valve mechanism 62 suitably attached to the compensator 48. The rotary control valve 62 has outlets 63, 64 and 66 and an inlet 67. The inlet 67 is connected by conduit 68 to a suitable fluid pump means (not shown) which may be suitably operated by the engine of a motor vehicle or by other suitable means. The outlet 63 is connected by suitable conduit 69 to the pump means to return fluid thereto and be circulated thereby.

A conduit 71 communicates the outlet 64 with the pressure chamber inlet 54 and a conduit 72 communicates the valve outlet 66 with the servomotor port 56.

The interior of the control valve 62 has a cylindrical housing 73 defining a cylindrical chamber 74. A cylindrical valve member 76 is concentric with the valve chamber 74 and has a diameter less than the diameter in the chamber 74. Projecting from the surface of the valve member 76 are valve means 77 and 78 that divide the interior of the valve into two flow passages 79 and 81 and also act to simultaneously have slight openings in the diametrically opposed outlets 64 and 66 when the valve 76 is in its normal position.

It is of course understood that the outlets 64 and 66 may be closed in their normal position if such is desired. However, it is preferable to have the outlets slightly open to maintain fluid pressure balance in the system and substantially prevent pressure voids from occurring.

The valve member 76 is rotatably mounted within the valve housing 73 and has suitable sealing means thereon. The valve member 76 has one end of a lever arm 82 suitably attached by means 83 thereto. The other end of the lever arm 82 is pivotally connected to one end of a vertical arm 84 with the other end of the vertical arm 84 pivotally connected to the suspension arm 31 by suitable means 86.

The cam is provided with a top shoulder portion 29a and a bottom shoulder 29b that limit the vertical travel of the follower roll 41. The cam shoulders may be provided with suitable shock absorbing means 29c such as a hard rubber stop means, on their inner surface to absorb any shock or banging that may occur when the follower roll 41 contacts said shoulders. For instance, when the vehicle encounters a larger bump or depression than has been allocated for by the size of the cam.

Therefore, when there is a load change, hereinafter referred to as "body load" change, due to braking, turning, acceleration, or passenger change in load it is desirable to allow the spring to have its natural spring rate counteract such forces. Therefore it is necessary that there is a corresponding position change of the cam 29 to compensate for this body load change. For instance, if less body load is placed on the frame 28 the frame is moved upwards and the cam follower roll 41 moves towards the cam shoulder 29b from its neutral central position illustrated in FIGURE 5. When the frame moves upwards, it causes the valve member 76 to rotate through the arm 82 in a counterclockwise direction. This counterclockwise rotation of the valve member 76 communicates the ports 64 and 67 with the passage 79 and the ports 66 and 63 with the passage 81. Therefore, pressurized fluid flowing into the conduit 67 flows through the conduit 71 into the piston chamber 52 and fluid from the piston chamber 53 flows through the conduit 72 into the passage 81 and out the conduit 69. This causes the housing 49 and cam to move downwards to thereby place the follower roll 41 in its neutral position on the cam surface 43. Thus the cam is moved to compensate for the cam surface 43 and the cam roll 41 to its normal position illustrated in FIGURE 5. Likewise, when a force tends to lower the frame and increase the load thereon, the valve member 76 is rotated in a clockwise direction to cause the housing 49 and cam 29 to move upwards and thereby move the cam 29 to its neutral position. When the neutral position of the follower roll 41 and cam surface 43 are reached, the conduit lines 71 and 72 are partially open by the valve member 76 is illustrated in FIGURE 6. Thus the follower roll and cam are now in position to counteract the spring rate of the spring at its new load carrying position.

Because the natural frequency of the body of the vehicle is usually about one-tenth the frequency of the wheel motion, the control valve 62 can be adjusted so that the motion of the cam will react almost instantaneously to the relative slow motion of the body, and prevent the cam from moving any distance in response to the movement of the follower roll 41 along the cam surface 43 due to the pivoting of the suspension arm 31 by the relative rapid motion of supporting wheel. Therefore, the rate of the supporting spring 32 is substantially cancelled as far as wheel motion is concerned and at the same time the position of the cam can be changed to meet the requirements of any simultaneous body load changes.

Referring to FIGURE 7 there is illustrated another embodiment of the suspension system of the present invention. The suspension system illustrated by FIGURE 7 is similar to the suspension system illustrated by FIGURES 1 through 5 in regards to the system for the vertical motion of the wheel 47. However, the suspension system in this embodiment has the cam 29 affixed to frame 28 and utilizes a servomotor compensator 84.

The servomotor compensator 84 comprises a servomotor 86 attached to the frame 28 and having a cylindrical housing with a piston 87 dividing the housing interior into two pressure chambers 88 and 89. The pressure chamber 88 has a port 91 communicating therewith and the pressure chamber 89 has a port 92 communicating therewith. The chamber 89 is adjacent to the frame 28 and below the piston 87. The piston 87 has a shaft 93 suitably attached thereto that extends through the lower end wall 94 of the housing 86 and is suitably attached to the support or chassis spring keeper 34. A control valve 96 attached to the frame 28 and having a cylindrical housing 97 is suitably attached to the frame 28 and vertically extends therefrom. Slidably received in the control valve housing is a spool valve member 98 having two end valve surfaces 99 and 101. Extending from the lower spool valve 101 is a shaft 102 passing through the lower end wall of the control valve 96. The shaft 102 is pivotally connected to one end of an arm 103 which has its other end suitably connected to the suspension arm 31.

The spool valve 98 is normally centered in the control valve housing 97 so that its valve surfaces 99 and 101 are equidistantly spaced from their respective end walls 100a and 100b. The valve housing 97 has five ports 104, 106, 107, 108 and 116 with the ports 104, 107 and 116 being formed in the side wall of the housing and the outlet ports 106 and 108 being respectively formed in the end walls 100a and 100b of the valve housing. The spool valve is sized and positioned such that the valve surfaces 99 and 101 simultaneously and normally close the ports 104 and 107 or have the ports partially open and communicating with the outlet ports 106 and 108 and having the port 116 positioned between said valve surfaces. The ports 104 and 107 are connected respectively to the ports 91 and 92 by conduits 109 and 111. The outlet ports 106 and 108 are both connected to a suitable fluid pump by conduits 112 and 113 and the central inlet port 116 is connected to a suitable conduit 114 that circulates fluid to the pump means.

Therefore, when the wheel 47 drops into a hole, the spring 32 is stretched and the suspension arm 31 is pivoted downwardly and the rate of the spring is compensated for by the force transmitted by the control springs 42 through follower roll onto the predetermined contoured cam surface 43. However, when a downward force is supplied to frame 28 by a change in the body load, the downward movement of the frame 28 moves the valve housing 96 downwards with respect to the spool valve member 98. This downward relative movement communicates the outlet 108 with the outlet 107 and the port 104 with the inlet 116. Therefore, fluid pressure is supplied to the chamber 88 while fluid is exited from the chamber 89 to urge the piston 87 downwards to thereby counteract the downward force on the frame by compressing spring 32 to support the new load. Likewise, the same result occurs with an upward force or reduced body load on the frame 28. Then pressure is supplied to the chamber 89 and fluid pressure released from the chamber 88 to urge the piston upwards to counteract the upward force by extending the spring 32.

In this manner the spring suspension system illustrated by FIGURE 7 is capable of maintaining a load at a predetermined horizontal level even though said encounters varying types of forces.

Also, in order to prevent premature movement of the cam 29 (FIGURE 5) and the piston 87 (FIGURE 7) due to pivoting of the suspension arm 31 when the wheel 47 encounters bumps or holes, there may be provided velocity valve means (not shown) for the ports of the respective servomotors.

Referring to FIGURES 8 and 9, there is illustrated another embodiment of a suspension system constructed in accordance to the principles of the present invention. In this embodiment of the present invention there is provided another system for counteracting the rate of a chassis spring wherein the cam follower mechanism is stationary and the cam means is moved. The vehicle suspended by this system has a vehicle frame 117 supporting a front wheel steering knuckle 118 by means of an upper control arm 119 and lower suspension arm 121 respectively. The upper control arm is pivoted at its inboard end to the frame 117 and is connected to the upper end of the steering knuckle 118 by means of a joint 123. Likewise, the lower suspension arm 121 is pivotally secured to the frame 117 and is connected to the steering knuckle by a load carrying joint 124. The weight of the vehicle is mainly carried by the lower suspension arm 121 and has positioned therebetween a coil chassis or load spring 126. A wheel (not shown) is rotatably mounted on the spindle 127 which extends from the steering knuckle 118. At the end of the arm 121 pivotally connected to the vehicle frame 117 is a rotary cam member 128 having four lobe cam surfaces 129 forming four projecting lobes 131. Each cam surface has a central surface 129a, a surface 129b on the one side of the central surface, and a surface 129c on the other side of the central surface. The cam 128 is connected to the end of the suspension arm 121 and is rotated by the pivoting motion of the suspension arm 121.

A cylindrical follower housing 132 is suitably affixed to the vehicle frame 117. The follower housing 132 has four tubular walls projecting from the outer surface thereof and being equally spaced from each other. Each tubular wall defines an inner passage 134 communicating with the interior of the follower housing 132. Mounted within each tubular wall is a cam follower mechanism 136 having a cam roller or skid 137 at the end thereof extending within the interior of the housing 132 and adapted to engage the cam surface 129. The follower rolls are urged against the cam surface by control springs 138 which are suitably enclosed in the tubular housing by covers 139.

The configuration of the cam surfaces 129a, 129b and 129c and the positioning and number of follower mechanisms 136 is determined such that the rate of the spring 126 will be counteracted when the suspension arm 121 is pivoted upwardly or downwardly such that when the follower rolls 137 engage the cam surfaces 129b, there will be a resulting upward vertical force component on the frame, and when the follower rolls engage the cam surface 129c there will be a resulting downward vertical force component on the frame, and when they engage the cam surface 129a there will be no resulting vertical force component on the frame.

Each follower roll 137 is adapted to normally contact the cam surface 129a when the vehicle is at a predetermined horizontal level and the wheels of the vehicle are on a smooth surface. However, when the wheel rides over a bump, the suspension arm pivots upwardly to pivot the cam 128 in a counterclockwise direction. The control springs urge each follower roll against the cam surfaces 129b to provide a resulting downward counteracting vertical force to counteract the rate of the load spring 126. Likewise, when the wheel drops into a hole, the suspension arm is pivoted downwardly to stretch the spring 126 and the follower rolls 137 contact the cam surfaces 129c to provide a resulting upward vertical force component to counteract the rate of the spring 126. In this manner the vehicle frame is maintained at its predetermined level as was previously explained in the other embodiments of the invention when encountering rises and depressions in the road surface.

Body load changes are compensated for by the servomotor 86 connected to the control valve 96 which is operated by the shaft 102 connecting the suspension arm 121 therewith. The servomotor 86, control valve 96 are interconnected by conduits 109 and 111 and are operated in the same manner as was described above with regards to the compensator means of FIGURE 7.

Although the present invention has been described by utilizing a coil load spring it is of course understood that leaf springs and other types of suspension means may be utilized.

It is of course understood that the cam housing 132 may rotate about the cam 128 to provide the compensating vertical forces, if desired, by attaching the housing 132 to the arm 121 and affixing the cam 128 to the frame 117.

Also, the present invention allows a vehicle to use a chassis spring which has a very high rate to substantially reduce the change in the jounce space with changes in body load and also to substantially eliminate the listing of the vehicle in a turn.

Therefore, I have provided a suspension system wherein the rate of the springs is counteracted for any rapid motion such as the wheel passing over irregularities by a first means and any body load change requirements of relatively long duration, such as a change of a passenger load, or change in the center of gravity due to centrifugal force in a turn or to inertia in brake applications are compensated for by a second means which moves the first means to a new position to counteract load change due to vertical wheel movement from the new normal position of the chassis spring and vehicle suspension means that will substantially maintain its axial position regardless of body load changes and vertical wheel movement.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. In a vehicle suspension system having a support spring, a sprung member and an unsprung member, a control device mounted between the two said members, said control device comprising a cam and cam follower respectively attached to the sprung and unsprung members, spring means forcing said cam and follower together, the cam having a contour engaging the follower to provide a vertical force component acting between the sprung and unsprung members compensating for the change in dynamic load that would otherwise be transmitted to the support spring when there is vertical movement of the unsprung member relative to the sprung member, and means for automatically adjusting the position of the cam relative to the sprung member at a rate faster than the frequency of the sprung member and slower than the frequency of the unsprung member to counteract the effect of changes in level of the sprung member on the cam.

2. In a vehicle suspension system having a support spring, a sprung member and an unsprung member, a control device mounted between the two said members, said control device comprising a cam and cam follower respectively attached to the sprung and unsprung members, spring means forcing said cam and follower together, the cam having a contour engaging the follower to provide a vertical force component acting between the sprung and unsprung members compensating for the change in dynamic load that would otherwise be transmitted to the support spring when there is vertical movement of the unsprung member relative to the sprung member, and an automatic servomotor compensator for automatically adjusting the position of the cam relative to the sprung member at a rate faster than the frequency of the sprung member and slower than the frequency of the unsprung member to counteract the effect of changes in level of the sprung member on the cam, said compensator including a piston and cylinder respectively carried by the sprung member and the cam, means for flowing hydraulic fluid to said cylinder for shifting the cam relative to the sprung member, and a valve actuated by the cam follower controlling the flow of hydraulic fluid to said cylinder.

3. In a vehicle suspension system having a support spring, a sprung member and an unsprung member, a control device mounted between the two said members, said control device comprising a cam and cam follower respectively attached to the sprung and unsprung members, spring means forcing said cam and follower together, the cam having a contour engaging the follower to provide a vertical force component acting between the sprung and unsprung members compensating for the change in dynamic load that would otherwise be transmitted to the support spring when there is vertical movement of the unsprung member relative to the sprung member, and means for automatically canceling, at a rate faster than the frequency of the sprung member and slower than the frequency of the unsprung member, the effect of changes in level of the sprung member on the cam.

4. A suspension system which comprises a support spring, an unsprung member carrying said support spring, a sprung member carried by said support spring, means applying a force equal and opposite to the change in dynamic load that would otherwise be transmitted to the support spring when there is vertical movement of the support member relative to the sprung member, and means responsive to changes in position of the sprung member caused by load changes thereon for varying the initiation of said force at a rate faster than the natural frequency of the sprung member and slower than the frequency of the support member to minimize movement of the sprung member regardless of load changes on both the support member and the sprung member.

5. A vehicle suspension system having a support spring, a sprung member and an unsprung member, a control device between the two said members, said control device comprising a cam having a plurality of peripherally spaced lobes and a cam follower coacting with each of said lobes, spring means forcing the cam and follower together, the cam having a contour engaging the followers to provide a vertical force component acting between the sprung and unsprung members compensating for the change in dynamic load that would otherwise be transmitted to the support spring when there is vertical movement of the unsprung member relative to the sprung member, and means for automatically adjusting at a rate faster than the frequency of the sprung member and slower than the frequency of the unsprung member, the relative positions of the cam and followers to counteract for changes in level of the sprung member on the cam and followers.

6. A spring suspension system for an automotive vehicle having a frame, upper and lower control arms pivotally mounted on the frame, a wheel spindle knuckle carried by said arms, and a support spring between the frame and lower control arm, a multiple lobed cam movable with said lower control arm, a cam follower housing surrounding said cam mounted on said frame, a cam follower for each of the cam lobes carried by said housing, spring means acting on said cam followers, said cam and cam followers providing a vertical force component acting between the frame and lower control arm compensating for the change in dynamic loads that would otherwise be transmitted to the frame when there is vertical movement of the spindle knuckle relative to the frame, and means compensating, at a rate faster than the frequency of the frame and slower than the frequency of the spindle knuckle the effect of changes in level of the frame on the cam and followers.

7. In a vehicle suspension system having a support spring, a sprung member and an unsprung member, a control device mounted between the two said members, said control device comprising a cam and cam follower respectively attached to the sprung and unsprung members, spring means forcing the cam and cam follower together, said cam having a contour engaging the follower to provide a vertical force component acting between the sprung and unsprung members compensating for the change in dynamic load that would otherwise be transmitted to the support spring when there is vertical movement of the sprung member relative to the unsprung member, and a hydraulic servomotor compensator between the sprung member and support spring for automatically adjusting the spring length at a rate faster than the frequency of the sprung member and slower than the frequency of the unsprung member to counteract the effect of changes in level of the sprung member on the cam.

References Cited by the Examiner

UNITED STATES PATENTS

| | | | |
|---|---|---|---|
| 1,897,538 | 2/1933 | Taber | 267—8 |
| 1,971,541 | 8/1934 | Taber | 267—20 X |
| 2,018,427 | 10/1935 | Taber | 267—11 |
| 2,818,273 | 12/1957 | Weihsmann | 280—124 |
| 2,874,956 | 2/1959 | Belle | 267—31 X |
| 2,904,343 | 9/1959 | Taber | 280—124 X |
| 2,913,253 | 11/1959 | Taber | 280—124 |
| 2,944,832 | 7/1960 | Taber | 280—124 |
| 2,989,322 | 6/1961 | Hrebicek | 280—124 |
| 3,065,976 | 11/1962 | Vogel | 280—124 |

FOREIGN PATENTS

| | | |
|---|---|---|
| 369,986 | 4/1932 | Great Britain. |
| 584,384 | 10/1958 | Italy. |

BENJAMIN HERSH, *Primary Examiner.*

A. HARRY LEVY, LEO FRIAGLIA, *Examiners.*

W. A. MARCONTELL, *Assistant Examiner.*